(12) United States Patent
Berry et al.

(10) Patent No.: US 11,271,935 B2
(45) Date of Patent: Mar. 8, 2022

(54) BLIND AUTHENTICATOR

(71) Applicant: BANK OF AMERICA CORPORATION, Charlotte, NC (US)

(72) Inventors: Anna Kristen Pingel Berry, Indian Land, SC (US); Stuart David Ford, Slapton (GB); Michael James Sbandi, Charlotte, NC (US); Robert Cain Durbin, Jr., New Hope, PA (US); Adam Kristian King, Fort Mill, SC (US); Chiamaka Azih, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 82 days.

(21) Appl. No.: 16/942,995

(22) Filed: Jul. 30, 2020

(65) Prior Publication Data
US 2022/0038459 A1    Feb. 3, 2022

(51) Int. Cl.
*H04L 29/06* (2006.01)
*G06F 21/30* (2013.01)
*H04L 9/40* (2022.01)

(52) U.S. Cl.
CPC .......... *H04L 63/0884* (2013.01); *G06F 21/30* (2013.01); *H04L 63/08* (2013.01); *H04L 29/06755* (2013.01)

(58) Field of Classification Search
CPC ................. H04L 63/0884; H04L 63/08; H04L 29/06755; G06F 21/30
See application file for complete search history.

(56) References Cited

U.S. PATENT DOCUMENTS

| | | |
|---|---|---|
| 6,458,595 B1 | 10/2002 | Selinfreund |
| 6,668,323 B1 | 12/2003 | Challener et al. |
| 7,152,693 B2 | 12/2006 | Man et al. |
| 7,231,526 B2 | 6/2007 | Hon et al. |
| 7,278,023 B1 | 10/2007 | Siegel et al. |
| 7,406,598 B2 | 7/2008 | Ducharme |
| 7,965,196 B2 | 6/2011 | Liebermann |
| 8,249,250 B2 | 8/2012 | Rane et al. |
| 8,285,563 B2 | 10/2012 | Willich et al. |
| 8,321,682 B1 | 11/2012 | Read et al. |
| 8,352,378 B2 | 1/2013 | Al-Herz et al. |
| 8,458,484 B2 | 6/2013 | Burke et al. |
| 8,504,474 B2 | 8/2013 | Armes et al. |

(Continued)

*Primary Examiner* — Huan V Doan (57) ABSTRACT

A blind authenticator performs an authentication procedure with two devices that provides the convenience offered by password storage but avoids storing the passwords themselves. Generally, the blind authenticator stores on the two devices portions of different code generation algorithms. These algorithms on the devices are incomplete—they may not execute properly on their own. During an authentication procedure, the blind authenticator communicates to the devices the remaining portions of these code generation algorithms so that the devices can execute their respective code generation algorithms. The devices then send the generated codes to the blind authenticator, which performs a code validation algorithm on the received codes to determine whether the codes are valid. The code validation algorithm is not sent to the devices, so the devices do not know what makes a code valid or invalid.

20 Claims, 3 Drawing Sheets

(56) References Cited

U.S. PATENT DOCUMENTS

| | | |
|---|---|---|
| 8,548,498 B2 | 10/2013 | Cedervall et al. |
| 8,606,595 B2 | 12/2013 | Udani |
| 8,655,796 B2 | 2/2014 | Udani |
| 8,782,800 B2 | 7/2014 | Brennan et al. |
| 9,059,840 B2 | 6/2015 | Connelly et al. |
| 9,171,347 B2 | 10/2015 | Caton et al. |
| 9,223,949 B1 | 12/2015 | Juang |
| 9,405,988 B2 | 8/2016 | Alves |
| 10,075,450 B2 | 9/2018 | Bush et al. |
| 10,193,689 B2 | 1/2019 | Resch et al. |
| 10,360,593 B2 | 7/2019 | Hunter et al. |
| 10,419,907 B2 | 9/2019 | Redding et al. |
| 10,552,846 B2 | 2/2020 | Caton et al. |
| 10,574,692 B2 | 2/2020 | Drake |
| 2013/0214909 A1 | 8/2013 | Meijers et al. |
| 2013/0217333 A1 | 8/2013 | Sprigg et al. |
| 2013/0282438 A1 | 10/2013 | Hunter et al. |
| 2014/0059148 A1 | 2/2014 | Boyd |
| 2014/0133656 A1 | 5/2014 | Wurster et al. |
| 2014/0157423 A1* | 6/2014 | Edelsten .............. G06F 21/121 726/26 |
| 2014/0169554 A1 | 6/2014 | Scarisbrick et al. |
| 2014/0254466 A1 | 9/2014 | Wurster et al. |
| 2014/0257885 A1 | 9/2014 | Gibson et al. |
| 2016/0063487 A1 | 3/2016 | Moreton |
| 2016/0201132 A1 | 7/2016 | Hayardeny et al. |
| 2016/0232460 A1 | 8/2016 | Gibson et al. |
| 2017/0111318 A1 | 4/2017 | Petry et al. |
| 2017/0318008 A1 | 11/2017 | Mead |
| 2019/0394648 A1 | 12/2019 | Tipton et al. |
| 2020/0152313 A1 | 5/2020 | Hanina et al. |
| 2020/0310929 A1* | 10/2020 | Li ...................... G06F 11/1637 |

\* cited by examiner

BLIND AUTHENTICATOR

TECHNICAL FIELD

This disclosure relates generally to security authentication.

BACKGROUND

Devices may form connections with one another over a network or the Internet. Before devices connect with one another, they may perform an authentication procedure with one another.

SUMMARY OF THE DISCLOSURE

Devices may form connections with one another over a network or the Internet. Before devices connect with one another, they may perform an authentication procedure with one another. In conventional systems, the devices may provide a password during the authentication procedure. If the password is correct, then the devices are authenticated. Otherwise, the devices are not authenticated. In some instances, these passwords may be stored to allow the devices to quickly authenticate with one another. For example, the passwords may be stored in a file, a database, or within the software code of the device. However, storing passwords creates a security risk. For example, when passwords are stored, they may be compromised or taken by a malicious user. As another example, when passwords are stored, they may be inadvertently changed, which causes the authentication procedure to fail.

This disclosure contemplates a blind authenticator that performs an authentication procedure with two devices that provides the convenience offered by password storage but avoids storing the passwords themselves. Generally, the blind authenticator stores on the two devices portions of different code generation algorithms. These algorithms on the devices are incomplete—they may not execute properly on their own. During an authentication procedure, the blind authenticator communicates to the devices the remaining portions of these code generation algorithms so that the devices can execute their respective code generation algorithms. The devices then send the generated codes to the blind authenticator, which performs a code validation algorithm on the received codes to determine whether the codes are valid. The code validation algorithm is not sent to the devices, so the devices do not know what makes a code valid or invalid. In this manner, even if the devices were compromised by a malicious user, the malicious user would not know how to complete the code generation algorithm on the device or how to generate a valid code. In this manner, the security of the system is improved in certain embodiments. Certain embodiments are described below.

According to an embodiment, an apparatus includes a memory and a hardware processor communicatively coupled to the memory. The hardware processor receives, from a first device, a request to initiate an authentication procedure with a second device. The first device stores a first portion of a first code generation algorithm. The second device stores a first portion of a second code generation algorithm. In response to receiving the request, the hardware processor generates a second portion of the first code generation algorithm. The hardware processor also communicates the second portion of the first code generation algorithm to the first device, receives, from the first device, a first code generated by executing the first and second portions of the first code generation algorithm, and after receiving the first code, generates a second portion of the second code generation algorithm. The hardware processor further communicates the second portion of the second code generation algorithm to the second device, receives, from the second device, a second code generated by executing the first and second portions of the second code generation algorithm, validates the first code with the second code using a code validation algorithm that is not communicated to the first and second devices, and in response to a determination that the first and second codes are valid, communicates to the first and second devices that the first device has been authenticated.

According to another embodiment, a method includes receiving, by a hardware processor communicatively coupled to a memory and from a first device, a request to initiate an authentication procedure with a second device. The first device stores a first portion of a first code generation algorithm. The second device stores a first portion of a second code generation algorithm. The method also includes, in response to receiving the request, generating, by the hardware processor, a second portion of the first code generation algorithm. The method further includes communicating, by the hardware processor, the second portion of the first code generation algorithm to the first device, receiving, by the hardware processor and from the first device, a first code generated by executing the first and second portions of the first code generation algorithm, and after receiving the first code, generating, by the hardware processor, a second portion of the second code generation algorithm. The method also includes communicating, by the hardware processor, the second portion of the second code generation algorithm to the second device, receiving, by the hardware processor and from the second device, a second code generated by executing the first and second portions of the second code generation algorithm, validating, by the hardware processor, the first code with the second code using a code validation algorithm that is not communicated to the first and second devices, and in response to a determination that the first and second codes are valid, communicating, by the hardware processor, to the first and second devices that the first device has been authenticated.

According to another embodiment, a system includes a first device, a second device, and a blind authenticator. The first device stores a first portion of a first code generation algorithm. The second device stores a first portion of a second code generation algorithm. The blind authenticator includes a memory and a hardware processor communicatively coupled to the memory. The hardware processor receives, from the first device, a request to initiate an authentication procedure with the second device and in response to receiving the request, generates a second portion of the first code generation algorithm. The hardware processor also communicates the second portion of the first code generation algorithm to the first device, receives, from the first device, a first code generated by executing the first and second portions of the first code generation algorithm, and after receiving the first code, generates a second portion of the second code generation algorithm. The hardware processor further communicates the second portion of the second code generation algorithm to the second device, receives, from the second device, a second code generated by executing the first and second portions of the second code generation algorithm, validates the first code with the second code using a code validation algorithm that is not communicated to the first and second devices, and in response to a determination that the first and second codes are valid, communicates to the first and second devices that the first device has been authenticated.

Certain embodiments provide one or more technical advantages. For example, an embodiment improves the security of an authentication procedure by avoiding the storage of passwords on a device. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
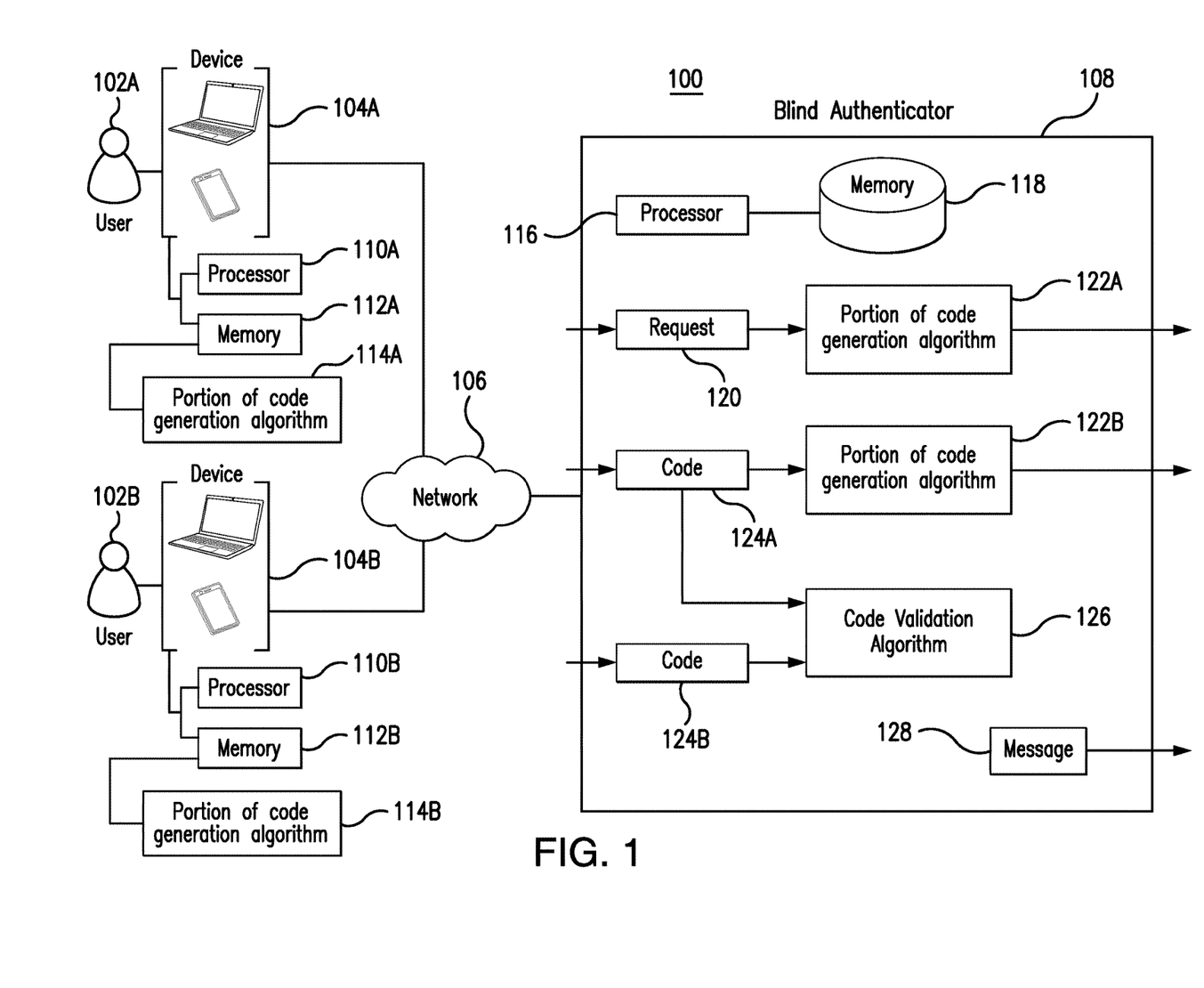
FIG. 1 illustrates an example system.
Figure 2:
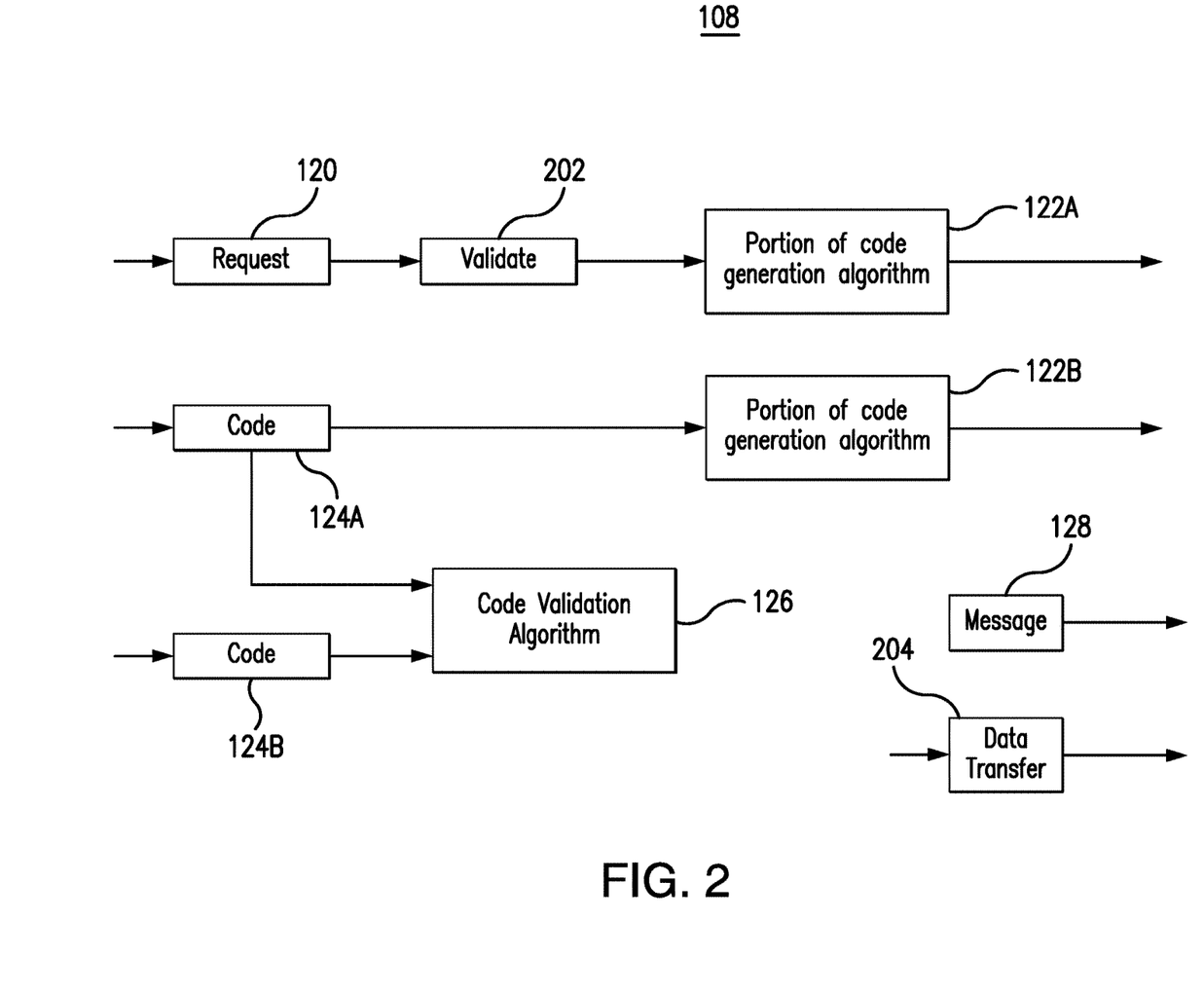
FIG. 2 illustrates an example blind authenticator in the system of FIG. 1.
Figure 3:
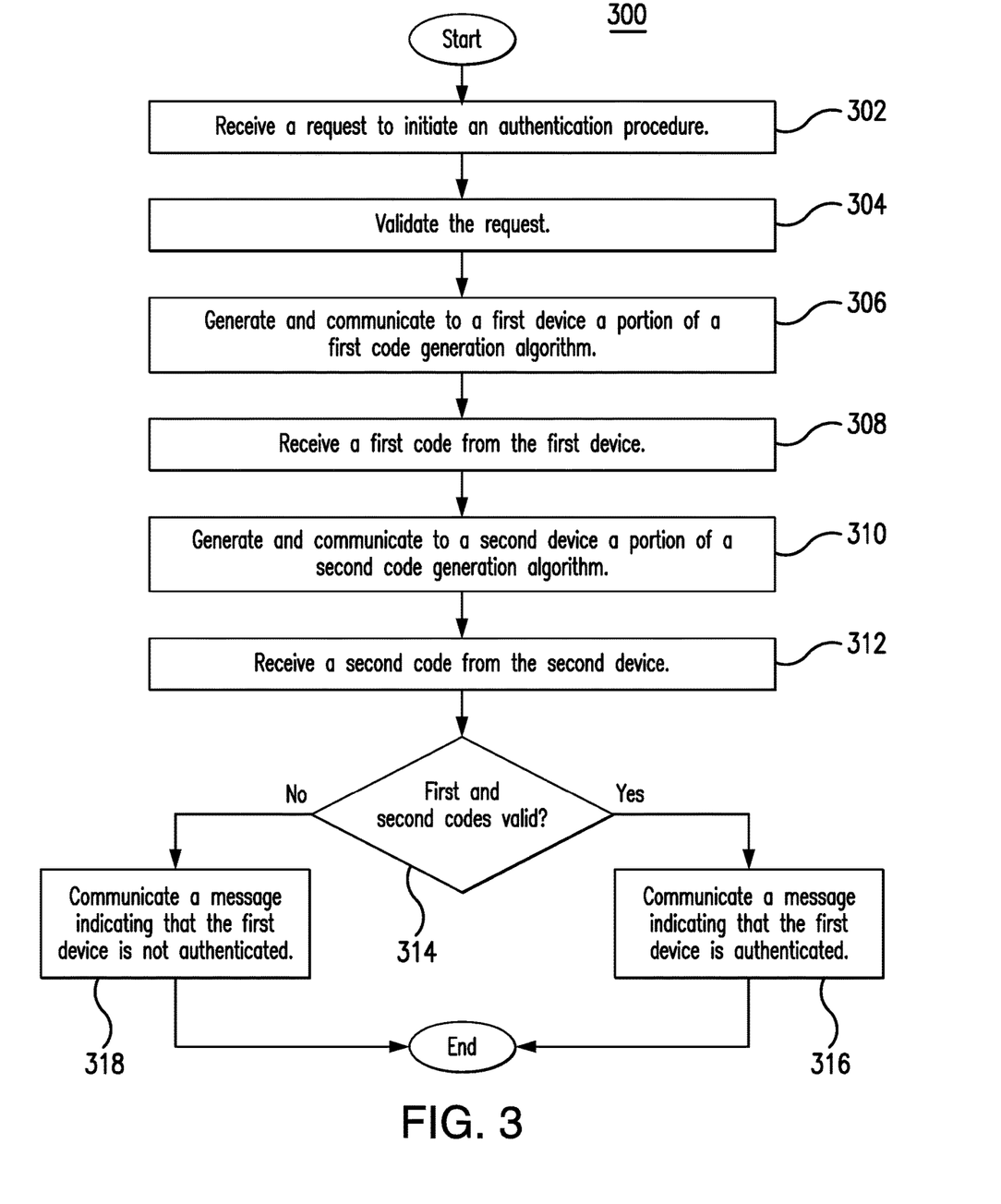
FIG. 3 is a flowchart illustrating a method of blind authentication using the system of FIG. 1.

Embodiments of the present disclosure and its advantages are best understood by referring to FIGS. 1 through 3 of the drawings, like numerals being used for like and corresponding parts of the various drawings.

Devices may form connections with one another over a network or the Internet. Before devices connect with one another, they may perform an authentication procedure with one another. In conventional systems, the devices may provide a password during the authentication procedure. If the password is correct, then the devices are authenticated. Otherwise, the devices are not authenticated. In some instances, these passwords may be stored to allow the devices to quickly authenticate with one another. For example, the passwords may be stored in a file, a database, or within the software code of the device. However, storing passwords creates a security risk. For example, when passwords are stored, they may be compromised or taken by a malicious user. As another example, when passwords are stored, they may be inadvertently changed, which causes the authentication procedure to fail.

This disclosure contemplates a blind authenticator that performs an authentication procedure with two devices that provides the convenience offered by password storage but avoids storing the passwords themselves. Generally, the blind authenticator stores on the two devices portions of different code generation algorithms. These algorithms on the devices are incomplete—they may not execute properly on their own. During an authentication procedure, the blind authenticator communicates to the devices the remaining portions of these code generation algorithms so that the devices can execute their respective code generation algorithms. The devices then send the generated codes to the blind authenticator, which performs a code validation algorithm on the received codes to determine whether the codes are valid. The code validation algorithm is not sent to the devices, so the devices do not know what makes a code valid or invalid. In this manner, even if the devices were compromised by a malicious user, the malicious user would not know how to complete the code generation algorithm on the device or how to generate a valid code. In this manner, the security of the system is improved in certain embodiments.

A practical application of the blind authenticator is that the blind authenticator improves the security of a system by avoiding the storage of passwords on devices. The blind authenticator may further provide the convenience offered by the storage of passwords even though the passwords are not stored. The system will be described in more detail using FIGS. 1 through 3.

FIG. 1 illustrates an example system 100. As seen in FIG. 1, system 100 includes one or more devices 104, a network 106, and a blind authenticator 108. Generally, system 100 allows devices 104 to authenticate with one another by communicating portions of code generation algorithms to the devices 104. Devices 104 then perform the code generation algorithms to produce codes. These codes are then validated using a code validation algorithm to authenticate the devices 104. In particular embodiments, system 100 provides the convenience offered by the storage of passwords without actually storing the passwords.

Users 102 use devices 104 to interact with other components of system 100. In the example of FIG. 1, a user 102A uses one or more devices 104A and a user 102B uses one or more devices 104B. Generally, device 104A may authenticate itself with device 104B to initiate a certain procedure between the two devices 104. For example, device 104A may authenticate itself with device 104B to initiate a data transfer to or from device 104B. In conventional systems, device 104A may automatically authenticate itself with device 104B using a stored password. For example, the password may be stored in a file, a database, software code, etc. When device 104A communicates the stored password to device 104B, device 104B considers device 104A authenticated and begins the requested procedure with device 104A. By storing the password, scripts and/or other automated procedures may automatically authenticate device 104A with device 104B thereby providing convenience and automation. However, storing the password exposes system 100 to certain security risks. For example, the password may be compromised or taken by a malicious user so that the malicious user gains access to device 104B. As another example, the password may be inadvertently changed which may then prevent device 104A and device 104B from authenticating with one another.

This disclosure contemplates devices 104A and 104B performing an unconventional authentication procedure with one another. Generally, devices 104A and 104B perform one or more code generation algorithms to produce codes that can be used to authenticate devices 104A and 104B with each other. At the outset, devices 104A and 104B may store only a portion of these code generation algorithms 114. It may not be possible for devices 104A and 104B to produce valid codes using only the stored portions of these code generation algorithms 114. In the example of FIG. 1, device 104A stores a portion of code generation algorithm 114A. Device 104B stores a portion of code generation algorithm 114B. In particular embodiments, portion of code generation algorithm 114A and portion of code generation algorithm 114B may be different from each other. For example, device 104A may implement a different code generation algorithm 114A than device 104B. As another example, device 104A and 104B may implement the same code generation algorithm 114, but the portion stored by device 104A may be different from the portion stored by device 104B. As part of the authentication procedure, devices 104 may receive the remaining portions of the stored code generation algorithms 114 from blind authenticator 108 so that devices 104 may perform the code generation algorithms 114 to produce codes.

Devices 104 may include a processor 110 and a memory 112. In the example of FIG. 1, device 104A includes a processor 110A and a memory 112A, and device 104B includes a processor 110B and a memory 112B. Processors 110 and memories 112 may be configured any of the actions or functions of devices 104 described herein.

Processor 110 is any electronic circuitry, including, but not limited to microprocessors, application specific integrated circuits (ASIC), application specific instruction set processor (ASIP), and/or state machines, that communicatively couples to memory 112 and controls the operation of device 104. Processor 110 may be 8-bit, 16-bit, 32-bit, 64-bit or of any other suitable architecture. Processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 110 may include other hardware that operates software to control and process information. Processor 110 executes software stored on memory to perform any of the functions described herein. Processor 110 controls the operation and administration of device 104 by processing information received from network 106, blind authenticator 108, and memory 112. Processor 110 may be a programmable logic device, a microcontroller, a microprocessor, any suitable processing device, or any suitable combination of the preceding. Processor 110 is not limited to a single processing device and may encompass multiple processing devices.

Memory 112 may store, either permanently or temporarily, data, operational software, or other information for processor 110. Memory 112 may include any one or a combination of volatile or non-volatile local or remote devices suitable for storing information. For example, memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 112, a disk, a CD, or a flash drive. In particular embodiments, the software may include an application executable by processor 110 to perform one or more of the functions described herein.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Blind authenticator 108 facilitates the authentication procedure between devices 104A and 104B. Generally, blind authenticator 108 communicates remaining portions of code generation algorithms 114 to devices 104A and 104B so that devices 104A and 104B can perform the completed code generation algorithms 114 to produce codes to authenticate devices 104A and 104B. Additionally, blind authenticator 108 validates codes produced by devices 104A and 104B using a code validation algorithm that is not communicated to devices 104A and 104B. In this manner, the security of the authentication procedure is improved over the password scheme because none of devices 104 and blind authenticator 108 can perform the full authentication procedure on its own. In particular embodiments, blind authenticator 108 allows devices 104A and 104B to automatically and conveniently authenticate themselves with one another without storing passwords. In the example of FIG. 1, blind authenticator 108 includes a processor 116 and a memory 118. Processor 116 and memory 118 may be configured to perform any of the actions or functions of blind authenticator 108 described herein.

Processor 116 is any electronic circuitry, including, but not limited to microprocessors, application specific integrated circuits (ASIC), application specific instruction set processor (ASIP), and/or state machines, that communicatively couples to memory 118 and controls the operation of blind authenticator 108. Processor 116 may be 8-bit, 16-bit, 32-bit, 64-bit or of any other suitable architecture. Processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 116 may include other hardware that operates software to control and process information. Processor 116 executes software stored on memory to perform any of the functions described herein. Processor 116 controls the operation and administration of blind authenticator 108 by processing information received from devices 104, network 106, and memory 118. Processor 116 may be a programmable logic device, a microcontroller, a microprocessor, any suitable processing device, or any suitable combination of the preceding. Processor 116 is not limited to a single processing device and may encompass multiple processing devices.

Memory 118 may store, either permanently or temporarily, data, operational software, or other information for processor 116. Memory 118 may include any one or a combination of volatile or non-volatile local or remote devices suitable for storing information. For example, memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 118, a disk, a CD, or a flash drive. In particular embodiments, the software may include an application executable by processor 116 to perform one or more of the functions described herein.

Blind authenticator 108 receives a request 120 from a device 104A. Request 120 may request initiation of an authentication procedure between device 104A and 104B. In response to receiving request 120, blind authenticator 108 may generate and/or communicate a remaining portion of a code generation algorithm 122A to device 104A. Portion 122A may be a remaining portion of the code generation algorithm 114A stored in device 104A. After receiving portion 122A, device 104A may have the complete code generation algorithm 114A. Device 104A may then perform the code generation algorithm 114A to produce a code 124A.

Blind authenticator 108 may receive code 124A from device 104A. In response to receiving code 124A, blind authenticator 108 generates and/or communicates a portion of a code generation algorithm 122B. Portion 122B may be the remaining portion of the code generation algorithm 114B stored in device 104B. By communicating portion 122B to device 104B, device 104B may have the complete code generation algorithm 114B. Device 104B may perform code generation algorithm 114B to produce a code 124B.

Portions 122A and 122B may be further protected in particular embodiments. For example, portions 122A and 122B may be time-limited. In other words, portions 122A and 122B may vary depending on the time at which they were generated. Moreover, portions 122A and 122B may only be valid for a certain extent of time. In this manner, even if portions 122A and 122B were intercepted during communication by a malicious user, the malicious user would not be able to use portions 122A and 122B beyond a certain time limit. In some embodiments, portions 122A and 122B may be one-time-use. In other words, once devices 104 receive portions 122 and perform the code generation algorithms 114, the portions 122 may no longer be valid or may no longer be used to generate a valid code 124.

After receiving code 124A and code 124B, blind authenticator 108 validates codes 124A and 124B using a code validation algorithm 126. Code validation algorithm 126 may not be communicated to devices 104A and 104B. In this manner, although devices 104A and 104B know how to generates codes 124, devices 104A and 104B do not know what makes these codes 124 valid. As a result, even if devices 104 were compromised by a malicious user, the malicious user would not know how to use devices 104 to generate a valid code 124. Code validation algorithm 126 may perform any suitable validation technique on codes 124A and 124B. For example, code validation algorithm 126 may compare codes 124A and 124B to see if they match. As another example, code validation algorithm 126 may be time-varying such that the same codes 124A and 124B are not valid past a certain time threshold. As yet another example, code validation algorithm 126 may perform a hash function on codes 124A and 124B to determine if the hash function produces the same result for both codes 124A and 24b. As yet another example, code validation algorithm 126 may concatenate codes 124A and 124B to determine whether the concatenated code matches a particular string.

Blind authenticator 108 may generate and communicate a message 128 that indicates the results of the authentication procedure. For example, if code validation algorithm 126 determines that codes 124A and 124B are valid, message 128 may indicate that the authentication procedure is successful. On the other hand, if code validation algorithm 126 determines that codes 124A and/or 124B are not valid, then message 128 may indicate that the authentication procedures was unsuccessful. Blind authenticator 108 may communicate message 128 to device 104A and/or 104B. If the authentication procedure was successful, device 104A and/or 104B may initiate a requested procedure with one another. For example, device 104A may initiate a data transfer to or from device 104B.

FIG. 2 illustrates an example blind authenticator 108 in the system 100 of FIG. 1. Generally, blind authenticator 108 facilitates an authentication procedure between devices 104A and 104B. In particular embodiments, blind authenticator 108 allows devices 104A and 104B to automatically authenticate themselves with one another without storing passwords.

Blind authenticator 108 receives a request 120 from device 104A. Request 120 may indicate that device 104A wants to authenticate itself with device 104B. In particular embodiments, device 104A may authenticate itself with device 104B to initiate a data transfer to or from device 104B. Blind authenticator 108 may validate 202 request 120 in any suitable manner. For example, blind authenticator 108 may examine information about device 104A in request 120 to validate that device 104A sent request 120. As another example, blind authenticator 108 may examine information about device 104B in request 120 to validate that device 104B is the intended target device 104. As another example, blind authenticator 108 may reference stored rules and/or permissions to determine whether device 104A is permitted to connect with device 104B. If device 104A is not permitted to connect with device 104B, then blind authenticator 108 may reject request 120. If device 104A is permitted to connect with device 104B, then blind authenticator 108 may proceed.

After validating request 120, blind authenticator 108 may generate and communicate a portion of code generation algorithm 122A. Portion 122A may be a remaining portion of a code generation algorithm 114A stored in device 104A. Blind authenticator 108 may communicate portion 122A to device 104A. After receiving portion 122A, device 104A may have the complete code generation algorithm 114A. Device 104A may then perform the code generation algorithm 114A to produce a code 124A. In certain embodiments, portion 122A is time-limited, such that portion 122A varies depending on the time at which portion 122A was generated and portion 122A is capable of being used to generate a valid code 124A for only a certain period of time. In this manner, if a malicious user were to intercept portion 122A, the malicious user would not be able to use portion 122A to generate a valid code 124A past that time limit. In some embodiments, portion 122A may be one-time use—once device 104A uses code generation algorithm 114A to generate code 124A, portion 122A may no longer be used to generate a valid code 124A.

Blind authenticator 108 receives code 124A from device 104A. In response to receiving code 124A, blind authenticator 108 generates and communicates a portion of a code generation algorithm 122B. Portion 122B may be a remaining portion of the code generation algorithm 114B stored in device 104B. Blind authenticator 108 may communicate portion 122B to device 104B. After receiving portion 122B, device 104B may have the complete code generation algorithm 114B. Device 104B may perform code generation algorithm 114B to produce code 124B. In certain embodiments, code generation algorithm 114B may be different from code generation algorithm 114A. In some embodiments, code generation algorithm 114B may be the same as code generation algorithm 114A. As with portion 122A, portion 122B may be time-limited and/or one time use.

Blind authenticator 108 may receive code 124B from device 104B. After receiving codes 124A and 124B, blind authenticator 108 may validate codes 124A and 124B using code validation algorithm 126. In certain embodiments, blind authenticator 108 does not communicate code validation algorithm 126 to other components of system 100. As a result, blind authenticator 108 is the only component in system 100 that can validate codes 124A and 124B. In this manner, even if another component of system 100 were compromised by a malicious user, the malicious user would not know how to generate a valid code 124 or what makes a code 124 valid. In some embodiments, code validation algorithm 126 may be time limited and/or one-time use, such as portions 122A and 122B. This may further improve the security of the authentication procedure, because even if a malicious user were to take code validation algorithm 126, the malicious user would not be able to use code validation algorithm 126 to produce or generate valid codes 124 past a certain time threshold or more than once.

Code validation algorithm 126 may validate codes 124 in any suitable manner. For example, code validation algorithm may compare codes 124 to see if the codes 124 match. As another example, code validation algorithm 126 may concatenate codes 124 to see if the concatenated code matches a string. As yet another example, code validation algorithm 126 may perform a hashing function on codes 124 to see if codes 124 produce the same result from the hashing function.

Blind authenticator 108 may generate and communicate a message 128 indicating the results of the authentication procedure. For example, if codes 124 are valid, blind authenticator 108 may generate and communicate message 128 indicating that the authentication procedure was successful. As another example, if codes 124 are not valid, blind authenticator 108 may generate and communicate a message 128 indicating that the authentication procedure was unsuccessful. Blind authenticator 108 may communicate message 128 to devices 104A and/or 104B to indicate the results of the authentication procedure. In response to receiving message 128, devices 104A and 104B may take appropriate action. For example, if message 128 indicates that the authentication procedure was successful, device 104A and 104B may initiate a data transfer 204. As another example, if message 128 indicates that the authentication procedure was unsuccessful then device 104A and 104B may stop performing a requested procedure and/or reperform the authentication procedure.

FIG. 3 is a flow chart illustrating a method 300 of blind authentication using the system 100 of FIG. 1. Generally, blind authenticator 108 performs method 300. In particular embodiments, by performing method 300, blind authenticator 108 allows devices 104A and 104B to automatically authenticate themselves with each other without storing passwords.

Blind authenticator 108 receives a request 120 to initiate an authentication procedure in step 302. The request 120 may have been sent by device 104A. In step 304, blind authenticator 108 validates 202 request 120. Blind authenticator 108 then generates and communicates to device 104A a portion of a code generation algorithm 122A in step 306. Device 104A may then perform a code generation algorithm 114A to produce a code 124A. In step 308, blind authenticator 108 receives a code 124A from device 104A. In response to receiving code 124A, blind authenticator 108 generates and communicates to a device 104B a portion of a code generation algorithm 122B in step 310. Device 104B may then perform a code generation algorithm 114B to produce a code 124B. In step 312, blind authenticator 108 receives code 124B from device 104B.

In step 314, blind authenticator 108 determines whether codes 124A and 124B are valid. In certain embodiments, blind authenticator 108 may use a code validation algorithm 126 to validate codes 124A and 124B. Blind authenticator 108 may be the only component of system 100 that knows code validation algorithm 126. If codes 124A and 124B aren't valid, blind authenticator 108 communicates a message 128 indicating that device 104A is authenticated in step 316. If codes 124A and 124B are not valid, blind authenticator 108 communicates a message 128 indicating that device 104A is not authenticated in step 318.

Modifications, additions, or omissions may be made to method 300 depicted in FIG. 3. Method 300 may include more, fewer, or other steps. For example, steps may be performed in parallel or in any suitable order. While discussed as particular components of system 100 performing the steps, any suitable component of system 100 may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory; and
   a hardware processor communicatively coupled to the memory, the hardware processor configured to:
   receive, from a first device, a request to initiate an authentication procedure with a second device, the first device storing a first portion of a first code generation algorithm, the second device storing a first portion of a second code generation algorithm;
   in response to receiving the request, generate a second portion of the first code generation algorithm;
   communicate the second portion of the first code generation algorithm to the first device;
   receive, from the first device, a first code generated by executing the first and second portions of the first code generation algorithm;
   after receiving the first code, generate a second portion of the second code generation algorithm;
   communicate the second portion of the second code generation algorithm to the second device;
   receive, from the second device, a second code generated by executing the first and second portions of the second code generation algorithm;
   validate the first code with the second code using a code validation algorithm that is not communicated to the first and second devices; and in response to a determination that the first and second codes are valid, communicate to the first and second devices that the first device has been authenticated.

2. The apparatus of claim 1, the hardware processor further configured to validate the request before generating the second portion of the first code generation algorithm.

3. The apparatus of claim 1, wherein the second portion of the first code generation algorithm is time limited.

4. The apparatus of claim 1, wherein generating the second portion of the first code generation algorithm varies based on time.

5. The apparatus of claim 1, the hardware processor further configured to determine whether the first code matches the second code.

6. The apparatus of claim 1, wherein the first code generation algorithm is different from the second code generation algorithm.

7. The apparatus of claim 1, the hardware processor further configured to initiate a data transfer between the first and second devices in response to the determination that the first and second codes are valid.

8. A method comprising:
receiving, by a hardware processor communicatively coupled to a memory and from a first device, a request to initiate an authentication procedure with a second device, the first device storing a first portion of a first code generation algorithm, the second device storing a first portion of a second code generation algorithm;
in response to receiving the request, generating, by the hardware processor, a second portion of the first code generation algorithm;
communicating, by the hardware processor, the second portion of the first code generation algorithm to the first device;
receiving, by the hardware processor and from the first device, a first code generated by executing the first and second portions of the first code generation algorithm;
after receiving the first code, generating, by the hardware processor, a second portion of the second code generation algorithm;
communicating, by the hardware processor, the second portion of the second code generation algorithm to the second device;
receiving, by the hardware processor and from the second device, a second code generated by executing the first and second portions of the second code generation algorithm;
validating, by the hardware processor, the first code with the second code using a code validation algorithm that is not communicated to the first and second devices; and
in response to a determination that the first and second codes are valid, communicating, by the hardware processor, to the first and second devices that the first device has been authenticated.

9. The method of claim 8, further comprising validating, by the hardware processor, the request before generating the second portion of the first code generation algorithm.

10. The method of claim 8, wherein the second portion of the first code generation algorithm is time limited.

11. The method of claim 8, wherein generating the second portion of the first code generation algorithm varies based on time.

12. The method of claim 8, further comprising determining, by the hardware processor, whether the first code matches the second code.

13. The method of claim 8, wherein the first code generation algorithm is different from the second code generation algorithm.

14. The method of claim 8, further comprising initiating, by the hardware processor, a data transfer between the first and second devices in response to the determination that the first and second codes are valid.

15. A system comprising:
a first device configured to store a first portion of a first code generation algorithm;
a second device configured to store a first portion of a second code generation algorithm; and
a blind authenticator comprising a memory and a hardware processor communicatively coupled to the memory, the hardware processor configured to:
receive, from the first device, a request to initiate an authentication procedure with the second device;
in response to receiving the request, generate a second portion of the first code generation algorithm;
communicate the second portion of the first code generation algorithm to the first device;
receive, from the first device, a first code generated by executing the first and second portions of the first code generation algorithm;
after receiving the first code, generate a second portion of the second code generation algorithm;
communicate the second portion of the second code generation algorithm to the second device;
receive, from the second device, a second code generated by executing the first and second portions of the second code generation algorithm;
validate the first code with the second code using a code validation algorithm that is not communicated to the first and second devices; and
in response to a determination that the first and second codes are valid, communicate to the first and second devices that the first device has been authenticated.

16. The system of claim 15, the hardware processor further configured to validate the request before generating the second portion of the first code generation algorithm.

17. The system of claim 15, wherein the second portion of the first code generation algorithm is time limited.

18. The system of claim 15, wherein generating the second portion of the first code generation algorithm varies based on time.

19. The system of claim 15, the hardware processor further configured to determine whether the first code matches the second code.

20. The system of claim 15, wherein the first code generation algorithm is different from the second code generation algorithm.

* * * * *